(12) United States Patent
Stephen et al.

(10) Patent No.: US 11,507,764 B2
(45) Date of Patent: *Nov. 22, 2022

(54) MULTI-LEVEL DISTRIBUTION AND TRACKING SYSTEMS AND METHODS

(71) Applicant: United States Postal Service, Washington, DC (US)

(72) Inventors: Victoria K. Stephen, Burke, VA (US); Elke Reuning-Elliott, Rosslyn, VA (US)

(73) Assignee: United States Postal Service, Washington, DC (US)

(*) Notice: Subject to any disclaimer, the term of this patent is extended or adjusted under 35 U.S.C. 154(b) by 106 days.

This patent is subject to a terminal disclaimer.

(21) Appl. No.: 17/025,533

(22) Filed: Sep. 18, 2020

(65) Prior Publication Data

US 2021/0004551 A1 Jan. 7, 2021

Related U.S. Application Data

(60) Division of application No. 16/727,416, filed on Dec. 26, 2019, now Pat. No. 10,783,341, which is a
(Continued)

(51) Int. Cl.
*G06K 7/10* (2006.01)
*B07C 3/10* (2006.01)
(Continued)

(52) U.S. Cl.
CPC .......... *G06K 7/10861* (2013.01); *B07C 3/10* (2013.01); *B07C 3/14* (2013.01); *B42D 5/025* (2013.01);
(Continued)

(58) Field of Classification Search
CPC ...... B42D 5/025; B42D 5/026; B42D 15/006; G07B 2017/00588; G07B 2017/00596;
(Continued)

(56) References Cited

U.S. PATENT DOCUMENTS 3,353,845 A * 11/1967 Curran ................. B42D 15/006
462/902
6,285,916 B1 9/2001 Kadaba et al.
(Continued)

OTHER PUBLICATIONS

International Search Report and Written Opinion dated May 25, 2017 in International Application No. PCT/US17/16285.
(Continued)

*Primary Examiner* — Suezu Ellis
(74) *Attorney, Agent, or Firm* — Knobbe Martens Olson & Bear LLP

(57) ABSTRACT

A distribution item includes a first item comprising a container having an outer surface defining an enclosed space. A computer-readable code is disposed on the outer surface. The computer-readable code is associated with a first level entity. The first item also includes destination information associated with a second level entity disposed on the outer surface. The distribution item also includes one or more second items removably positioned within the enclosed space of the first item. Each of the one or more second items includes the computer-readable code associated with the first level entity.

6 Claims, 5 Drawing Sheets

Related U.S. Application Data continuation of application No. 15/423,407, filed on Feb. 2, 2017, now Pat. No. 10,521,632.

(60) Provisional application No. 62/291,807, filed on Feb. 5, 2016.

(51) Int. Cl.
*B07C 3/14* (2006.01)
*G06Q 10/08* (2012.01)
*B42D 5/02* (2006.01)
*G06K 7/14* (2006.01)
*G07B 17/00* (2006.01)

(52) U.S. Cl.
CPC ......... *G06K 7/1413* (2013.01); *G06K 7/1417* (2013.01); *G06Q 10/0833* (2013.01); *G07B 2017/00475* (2013.01); *G07B 2017/00588* (2013.01); *G07B 2017/00596* (2013.01); *G07B 2017/00709* (2013.01)

(58) Field of Classification Search
CPC .. G07B 2017/00612; G07B 2017/0062; G07B 2017/00709; G07B 2017/00717
USPC .................................. 235/462.01, 385, 487
See application file for complete search history.

(56) References Cited

U.S. PATENT DOCUMENTS

| | | | |
|---|---|---|---|
| 6,360,001 B1 * | 3/2002 | Berger | G06V 30/1444 |
| | | | 382/101 |
| 10,521,632 B2 * | 12/2019 | Stephen | G06K 7/1413 |
| 10,521,633 B2 | 12/2019 | Stephen et al. | |
| 2002/0029152 A1 | 3/2002 | Lee et al. | |
| 2002/0153720 A1 | 10/2002 | Asay | |
| 2003/0087681 A1 | 5/2003 | Sackett et al. | |
| 2003/0113151 A1 | 6/2003 | Yokoyama et al. | |
| 2004/0153379 A1 | 8/2004 | Joyce et al. | |
| 2004/0215480 A1 | 10/2004 | Kadaba | |
| 2006/0149577 A1 | 7/2006 | Stashluk, Jr. et al. | |
| 2009/0321296 A1 | 12/2009 | Luciano, Jr. et al. | |
| 2010/0059583 A1 * | 3/2010 | Stier | B65D 27/06 |
| | | | 229/92.8 |
| 2013/0026226 A1 | 1/2013 | Luciano, Jr. et al. | |
| 2013/0198060 A1 | 8/2013 | Whitehouse | |
| 2014/0190050 A1 | 7/2014 | Raming | |
| 2015/0339622 A1 | 11/2015 | MacDonald et al. | |

OTHER PUBLICATIONS

International Preliminary Report on Patentability dated Aug. 7, 2018 in International Application No. PCT/US17/16285.

\* cited by examiner

MULTI-LEVEL DISTRIBUTION AND TRACKING SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional of U.S. application Ser. No. 16/727,416, filed Dec. 26, 2019, which is a continuation of U.S. application Ser. No. 15/423,407, filed Feb. 2, 2017, which, in turn, claims the benefit of priority to U.S. Provisional Application No. 62/291,807, filed Feb. 5, 2016.

BACKGROUND

Field

This disclosure relates to distributing and tracking items. In particular, this disclosure relates to systems and methods for distributing and tracking items among multiple levels of entities.

Description

Distribution networks are used to distribute or deliver items, for example, pieces of mail, parcels, packages, inventory, and the like, between various entities. A first entity can entrust an item to the distribution network to be delivered to a second entity. In some instances, the distribution network can provide the first and/or second entity with tracking and/or status information regarding the item while it is being routed from the first entity to the second entity. In many cases, the distribution network can charge a fee for its services, and the cost can be incurred in the form of pre-paid postage.

SUMMARY

The embodiments of multi-level distribution and tracking systems and methods disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods.

In a first aspect, a distribution item is disclosed. The distribution item includes a first item comprising a container having an outer surface defining an enclosed space. A computer-readable code is disposed on the outer surface. The computer-readable code is associated with a first level entity. The first item also includes destination information associated with a second level entity disposed on the outer surface. The distribution item also includes one or more second items removably positioned within the enclosed space of the first item. Each of the one or more second items includes the computer-readable code associated with the first level entity.

In some embodiments, the first item includes a unique identifier associated with the first item and each of the one more second items includes a unique identifier associated with each of the one more second items. In some embodiments, each of the unique identifiers on each of the one or more second items is also associated with the first level entity. In some embodiments, each of the unique identifiers on each of the one or more second items comprises a machine-readable code. In some embodiments, the one or more second items comprise a substrate divided into a plurality of sections by perforations, and wherein each of the plurality of sections comprises the computer-readable code, wherein the perforations are configured such that the substrate can be torn along the perforations to separate the plurality of sections. In some embodiments, each of the one or more second items includes destination information associated with a third level entity. In some embodiments, when the first item is processed by a distribution network, the computer-readable code positioned on the outer surface of the first item is scanned by an imaging device of the distribution network, and the computer-readable codes included on the one or more second items removably positioned within the enclosed space of the first item are shielded from the imaging device by the outer surface of the first item. In some embodiments, the computer readable code disposed on the first item is recognizable by a distribution network when the distribution network delivers the first item, including the one or more second items removably positioned within the enclosed space of the first item, to the second level entity. In some embodiments, when the one or more second items are removed from the enclosed space of the first item, the computer-readable codes included on the one or more second items are configured to be scanned by an imaging device of a delivery network. In some embodiments, when the computer-readable codes included on the one or more second items are scanned by the imaging device, tracking information is made regarding the one or more second items is generated associated with the first level entity. In some embodiments, when the computer-readable code included on each of the one or more second items is recognizable by a distribution network when each of the one or more second items are processed by the distribution network.

In another aspect, a multi-level distribution and tracking system is disclosed. The system includes processing equipment configured to receive a plurality of items processed by a distribution network, the distribution network capable of delivering the plurality of items to a plurality of destinations, each of the plurality of items including a computer-readable code associated with a first level entity. The processing equipment includes an imaging device configured to capture images of the plurality of items, and a sorter configured to route each of the plurality of items to one of the plurality of destinations based on information included in the compute-readable code. The system also includes one or more processors communicatively coupled to the processing equipment and configured to receive the captured images from the imaging device. The one or more processors are configured to analyze a captured image of an item of the plurality of items to detect the computer-readable code associated with the first level entity; extract from the captured image of the item origination address information associated with a second level entity and destination address information associated with a third level entity; generate tracking information for the item, the tracking information including at least the destination address information; and associate the tracking information for the item with the first level entity based on the detected computer-readable code associated with the first level entity.

In some embodiments, the one or more processors are further configured to display the tracking information to the first level entity via an online user interface. In some embodiments, the imaging device comprises a digital camera. In some embodiments, the system further comprises a scanning device. In some embodiments, the system further comprises a printer. In some embodiments, the one or more processors are further configured to associate a cost with the first level entity when the computer-readable code associated with the first level entity is detected.

BRIEF DESCRIPTION OF THE DRAWINGS

The foregoing and other features of the multi-level distribution and tracking systems and methods disclosed herein will become more fully apparent from the following description and appended claims, taken in conjunction with the accompanying drawings. The drawings may not be to scale.

DETAILED DESCRIPTION

Figure 1:
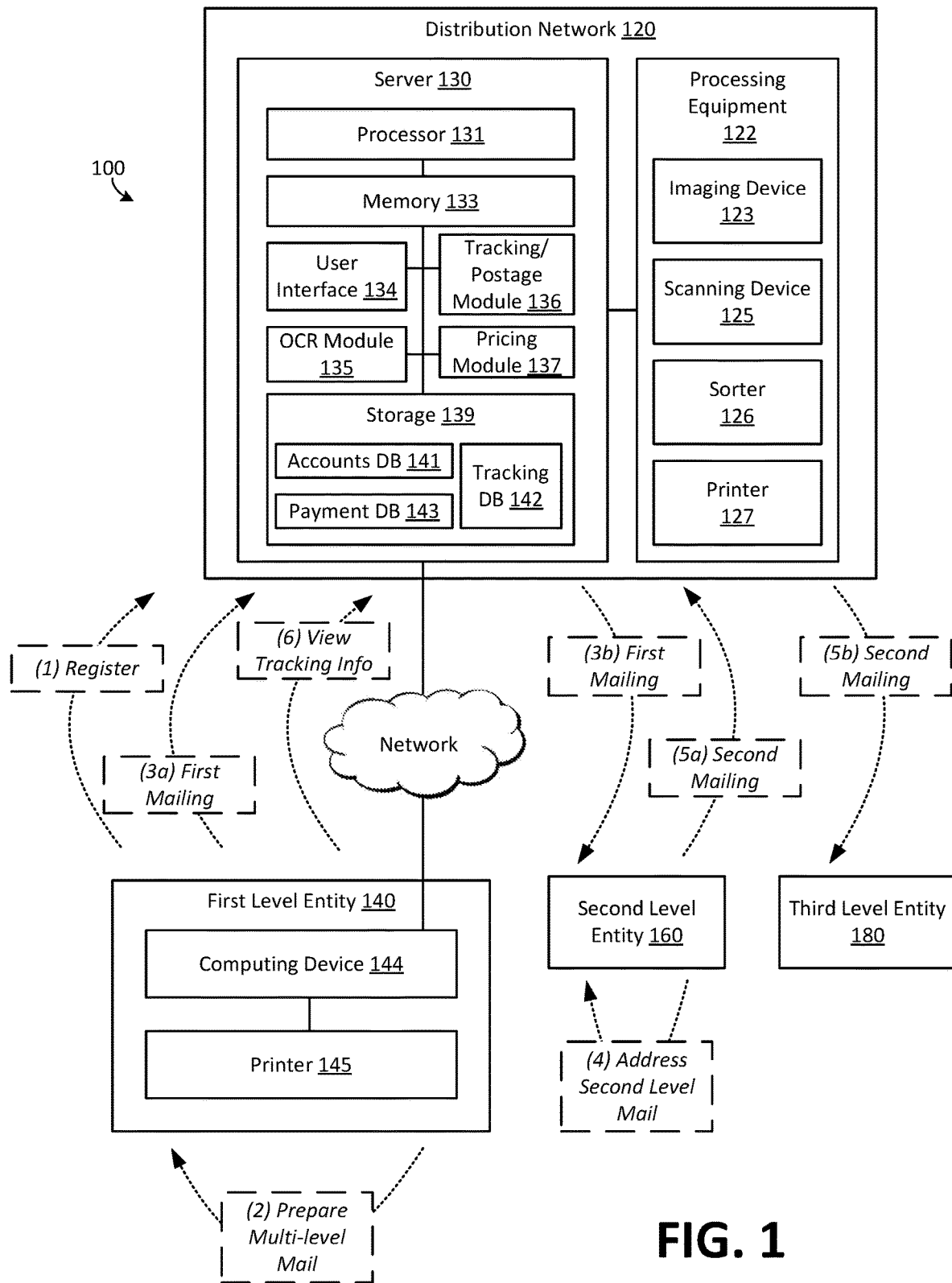
FIG. 1 is a block diagram illustrating an embodiment of a multi-level distribution and tracking system.

The systems and methods described throughout this disclosure are often referred to herein as "multi-level" distribution and tracking systems and methods. This can mean that, in some embodiments, items can be distributed and tracked among multiple levels of one or more entities. In some instances, distribution and tracking of the items can be accomplished by means of a distribution network. As used herein, the term "level" when used with regard to various entities can refer to entities at various levels of a hierarchy, to entities along a chain, such as a distribution chain, or simply to differentiate between different entities according to an order of receipt or sending of items, or simply to refer to different entities.

As an initial example, using the systems and methods described herein, a first level entity can prepare items to be delivered to a second level entity via a distribution network. At least a subset of the items prepared by the first level entity can be intended for further distribution from the second level entity to a third level entity. Upon receipt of the items prepared by the first level entity, the second level entity can further prepare the subset of items to be delivered to the third level entity via the distribution network. The distribution network can track the items as they are delivered between the entities and tracking information can be reported to the first level entity (or other entities). Thus, the first level entity can know when and if the second level entity actually sends the subset of items to the third level entity and when the third level entity receives the subset of items. In some embodiments, costs for using the distribution network, according the principles described herein, are only incurred by the first level entity (or other entities). In some embodiments, costs are only incurred to the first level entity when items are actually processed by the distribution network. Thus, in some embodiments, the first level entity can prepare items for the second level entity to deliver to the third level entity, and the first level entity only incurs costs if and when the second level entity actually sends the items to the third level entity via the distribution network. These and other aspects and uses of the multi-level distribution tracking systems and methods described herein will be further explained below.

In the following detailed description, reference is made to the accompanying drawings. In the drawings, similar symbols typically identify similar components, unless context dictates otherwise. Thus, in some embodiments, part numbers can be used for similar components in multiple figures, or part numbers can vary from figure to figure. The illustrative embodiments described herein are not meant to be limiting. Other embodiments can be utilized, and other changes can be made, without departing from the spirit or scope of the subject matter presented. It will be readily understood that the aspects of the present disclosure, can be arranged, substituted, combined, and designed in a wide variety of different configurations by a person of ordinary skill in the art, all of which are made part of this disclosure.

Reference in the specification to "one embodiment," "an embodiment," or "in some embodiments" means that a particular feature, structure, or characteristic described in connection with the embodiment is included in at least one embodiment of the disclosure. Moreover, the appearance of these or similar phrases throughout the specification do not necessarily all refer to the same embodiment, nor are separate or alternative embodiments necessarily mutually exclusive. Various features are described herein which can be exhibited by some embodiments and not by others. Similarly, various requirements are described which can be requirements for some embodiments but may not be requirements for other embodiments.

FIG. 1 is a block diagram illustrating one embodiment of a multi-level distribution and tracking system 100. The system 100 is illustrated in simplified form, with solid blocks representing various elements of the system 100. As will be explained below, these elements can represent entities, in other words, users and/or facilitators of the system 100; physical and/or structural components, for example, pieces of hardware; and/or software modules, which can include software instructions that can be, for example, stored in computer-readable media and executed by one or more processors to perform various functions of the system 100. Further, the elements shown in FIG. 1 are not intended to be exhaustive—that is, the system 100 can include additional elements that are not illustrated. FIG. 1 also includes several dashed arrows representing example steps in using the system 100 and/or interactions between various elements of the system 100. As before, the illustration is not intended to be exhaustive, and other steps and/or interactions between the elements of the system 100 are possible. FIG. 1 will now be described, with emphasis first on the elements of the system 100, followed by a description of the steps in using the system 100 and the interactions between various elements of the system 100, as illustrated with the dashed arrows.

In the illustrated embodiment, the system 100 includes a distribution network 120, a first level entity 140, a second level entity 160, and a third level entity 180. In some embodiments, the distribution network 120 is an organization for collecting and distributing items (such as pieces of mail, for example), such as the United States Postal Service (USPS). The distribution network 120 facilitates the system 100 by receiving and delivering items between the first level entity 140, the second level entity 160, and the third level entity 180. In some embodiments, the distribution network 120 also tracks the items as they are sent between the first level entity 140, the second level entity 160, and the third level entity 180 and provides information related to this tracking to one or more of the first, second, or third level entities 140, 160, 180. The first level entity 140, the second level entity 160, and the third level entity 180 can each be an individual (i.e., a person) or organization (for example, a business) that sends or receives items via the distribution network 120 as part of the system 100. Although, three levels of entities are shown in FIG. 1 and described throughout this disclosure, in some embodiments, the system 100 can be extrapolated using the principles described herein to include more than three levels of entities, for example, four, five, six, or more levels of entities. In some embodiments, the system 100 can include two levels of entities. In some embodiments, each level includes one entity at that level. In some embodiments, each level can include a plurality of entities. In some embodiments, one level can include one entity, and another level can include a plurality of entities.

The distribution network 120 can include processing facilities such as regional distribution facilities, hubs, and unit delivery facilities. For example, the distribution network can include one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the USPS, the unit delivery facility can be associated with a ZIP code. The unit delivery facility receives items from local senders and from hub level facilities or regional distribution facilities. The unit delivery facility also sorts and stages the items intended for delivery to destinations within the unit delivery facility's coverage area. Other organizations and structures are possible for distribution networks.

Any level of the distribution network can use automated processing equipment 122 to process items. For example, where the distribution network is the USPS, a processing facility receives daily a very high volume of items, such as letters, flats, and parcels, which must be sorted for processing. This can be accomplished using automated equipment that can scan, read, or otherwise interpret a destination end point located on or associated with each item processed. In some embodiments, the destination end point can be encoded in a computer-readable code, such as a barcode printed on or affixed to the item. In some embodiments, the destination end point can be read by taking an image of the item and performing an optical character recognition (OCR) process on the image, and determining the delivery end point from the OCR'd address. In some embodiments, manual sorting, scanning, or otherwise processing methods can be employed.

The distribution network 120 illustrated in FIG. 1 can be representative of any or all of the facilities of the distribution network 120 outlined above. Further, only some of the elements of the system 100 are illustrated in the FIG. 1. As shown, the distribution network 120 includes processing equipment 122 which includes an imaging device 123, a scanning device 125, a sorter 126, and a printer 127. The processing equipment 122 can be connected to a server 130. The processing equipment 122 and the server 130 can be communicatively connected, for example, over a computer network, such as a local area network (LAN) or a wide area network (WAN), including the internet. Although only one instance of each of these components is illustrated in FIG. 1, each of these can be duplicated and/or distributed across various facilities of the distribution network 120. For example, processing equipment 122 (including or more of the imaging device 123, the scanning device 125, the sorter 126, and the printer 127) can be located at a unit delivery facility and the server 130 can be located at a remote data center accessible over a computer network. In some embodiments, the imaging device 123 and/or scanning device 125 are located at an intake facility, such that incoming items can be imaged or scanned. In some embodiments, multiple imaging devices 123 and multiple scanning devices 127 are employed to process the items.

The imaging device 123 can be any type of device capable of capturing an image of the items being processed by the distribution network 120 as part of the system 100. For example, the imaging device 123 can be a camera (e.g., a digital camera) configured to capture still and/or video images. In some embodiments, the imaging device 123 can include a two-dimensional array of image pixel sensors. The image sensors can be charge-coupled device (CCD) pixel sensors, complementary metal-oxide-semiconductor (CMOS) pixel sensors, or the like. The image sensors can form a two dimensional array of image sensors and can be configured to convert light into digital signals that represent an image. As will be described in greater detail below in reference to FIGS. 2A-2D, an item that is processed by the distribution network 120 as part of the system 100 can include barcodes (or other computer-readable codes or images), return address information, destination address information, postage, postage- or cost-indicating indicia, and/or other information. In use, the imaging device 123 can be positioned, either fixedly mounted or manually manipulated (for example, handheld), such that a field of view of the imaging device 123 can capture an image of an item, where the item has a label, a computer-readable code, and/or other information included thereon. The captured image of the item can be processed, in some embodiments, by the server 130, to read the label, decode barcode information, perform optical reading of printed or written information (for example, return and destination addresses), and gather other information about the item. In some embodiments, contextual information associated with the capture of an image, such as the time and/or location of the image capture, can be associated with the image and/or the information extracted therefrom. This contextual information can be used to track the item as it moves through the distribution network 120 as part of the system 100. The captured image, as well as the contextual information, can also be saved, for example, in a storage 139 of the server 130. In some embodiments, the imaging device 123 can be omitted.

The scanning device 125 can be any type of device capable of reading a computer-readable code (such as a barcode, a QR code, RFID tag, etc.). The scanning device 125 can be a one-dimensional or two-dimensional barcode scanning device, a photo diode pen type reader, a laser barcode scanner, a charge coupled diode (CCD) scanner, or a camera based barcode scanner, among others. Other types of computer-readable codes, such as radio-frequency identification (RFID) codes, are also useable in the system 100, and as such, the scanning device 125 can include an RFID reader or the like. Similar to the imaging device 123 described above, the scanning device 125 is able to extract information from items processed by the distribution network 120 as part of the system 100. Information obtained from these scans, as well as other contextual information, such as the time and/or location of the scan, can be used to process or track the item and/or be saved for future use by the system 100, for example, in a storage 139 of the server 130. In some embodiments, the scanning device 125 is integrated with the imaging device 123. In some embodiments, the scanning device 125 can be omitted.

In some embodiments, the sorter 126 is configured to receive a plurality of items and route the plurality of items to a plurality of destinations. For example, items can be inducted onto the sorter 126, and the sorter 126 can route each of the items to one of a plurality of destination bins. In some embodiments, each destination bin may be associated with an additional processing center or a geographical region, such as a ZIP code, for example. In some embodiments, the sorter 126 comprises one or more conveyor systems and one or more chutes.

In some embodiments, the sorter 126 routes the items to the appropriate destinations based on information included on the items, such as information included on the label, information encoded into a computer-readable code, or printed or hand-written information included on the items. In some embodiments, the information is obtained from an image captured by the imaging device 123 (and subsequently processed to extract the information) or a scan performed by the scanning device 125. For example, the imaging device 123 can capture an image of an item (including a label, computer-readable code, or other information) either before the item is loaded onto the sorter 126 or while the item is on the sorter 126. The captured image can be processed to extract information from including the label, computer-readable code, or other information. The sorter 126 then routes the item to an appropriate destination based on the extracted information. In some embodiments, the sorter 126 routes items to particular destinations when the items include a computer-readable code associated with the first level entity 140, the second level entity 160, and/or the third level entity 180.

In some embodiments of the system 100, the processing equipment 122 includes a printer 127. The printer 127 can be of any type and can be configured for printing one or more of the items (or labels attachable to the items) to be distributed through the system 100.

Although only one server 130 is illustrated in FIG. 1, the system 100 can include multiple servers, and the various components of the server 130 illustrated in FIG. 1 need not all be contained within a single server. The term "server" is used in a broad sense herein to refer to any computing device (or combination of multiple computing devices) that can process and store information. In some embodiments, the server 130 (or one or more of the components thereof) can be integrated with another device. For example, one or more components of the server 130 can be integrated with the processing equipment 122. As previously noted, in some embodiments, the server 130 can be remotely located from the imaging device 123, the scanning device 125, and/or the printer 127. However, the server 130 can be communicatively connected to these devices.

In the illustrated embodiment, the server 130 includes a processor 131, a memory 133, and the storage 139. The server 130 also includes a user interface module 134, an OCR module 135, a tracking and postage module 136, and a pricing module 137. In some embodiments, these modules are stored in the memory 133. The storage 139 includes an accounts database 141, a tracking database 142, and a payment database 143. Although only one instance of each of these features is illustrated in FIG. 1, in some embodiments, the server 130 can include more than one of each. In some embodiments, one or more of these features can be omitted and/or combined with another feature. The various features and modules discussed in reference to the server 130 can each be carried out, executed, or realized in hardware, software, or a combination thereof.

The processor 131 can be a central processing unit (CPU) or other type of hardware processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, or in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. The processor 131 can perform logical and arithmetic operations based on program instructions, modules, or software stored within the memory 133 and/or the storage 139 (such as the user interface module 134, the OCR module 135, the tracking/postage module 135, and/or the pricing module 137, for example). Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor 131, cause the server 130 to perform the various functions described herein.

The memory 131 and/or storage 139 can each be a RAM memory, a flash memory, a ROM memory, an EPROM memory, an EEPROM memory, a register, a hard disk, a removable disk, a CD-ROM, or any other form of storage medium known in the art. Exemplary memory 131 and storage 139 are coupled to the processor 131 such the processor 131 can read information from and write information to the memory 131 and storage 139. In some embodiments, the memory 131 and/or storage 139 can be integral to the processor 131.

The memory 131 and/or storage 139 can store an operating system that provides computer program instructions for use by the processor 131 or other elements in the general administration and operation of the system 100

In the illustrated embodiment, the server 130 includes a user interface module 134, an OCR module 135, a tracking and postage module 136, and a pricing module 137. Each of these can include instructions that configure the processor 131 to perform one or more functions of the system 100 as described below. However, these modules are provided by way of example only, and can be omitted, combined, and/or modified in a wide variety of ways. As can be appreciated by one of ordinary skill in the art, each of the modules can comprise various sub-routines, procedures, definitional statements and macros. Each of the modules can be separately compiled and linked into a single executable program. Therefore, the following description of each of the modules is used for convenience to describe the functionality of the preferred system. Thus, the processes that are undergone by each of the modules can be arbitrarily redistributed to one of the other modules, combined together in a single module, or made available in, for example, a shareable dynamic link library.

The instructions can be written in any programming language such as, for example, C, C++, C#, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, C#, BASIC, Visual Basic, Pascal, Ada, Java, HTML, XML and FORTRAN are industry standard programming languages for which many commercial compilers can be used to create executable code.

In some embodiments, the user interface module 134 includes instructions that cause the processor 131 to display the user interface to a user of the system 100. The user interface can be configured to display information regarding the system 100 to a user and/or receive information from a user. In some embodiments, the user interface 134 is accessible as a website, and thus can be accessed by a user remotely, using any computing device, for example, a personal computer, tablet, or smart phone. A website can refer to one or more interrelated web page files and other files and programs on one or more web servers. The files and programs are accessible over a computer network, such as the Internet, by sending a hypertext transfer protocol (HTTP or HTTPS [S-HTTP]) request specifying a uniform resource locator (URL) that identifies the location of one of the web page files, where the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains. A web page or electronic page can include that which is presented by a standard web browser in response to an HTTP request specifying the URL by which the web page file is identified. A web page can include, for example, text, images, sound, video, and animation. Alternatively, the user interface can be displayed on a display of a terminal, workstation, or other computing device located at the distribution network 120.

The user interface 134 can allow users to create or register accounts for using the system 100, access tracking information available in the system 100, make payments for use of the system 100, verify that mail pieces conform to requirements of the system 100, print or create mail pieces to be sent through the distribution network 120 as part of the system 100, and other functions. The various functions of the user interface will become apparent from the general description of the use of the system 100 and the examples described elsewhere in this disclosure.

The OCR module 135 can include software instructions that configure the processor 131 to process image or scan data obtained by the imaging device 123 and the scanning device 125. For example, the OCR module 135 can include instructions that extract computer-readable information from the images as described above. As further examples, the OCR module 135 can be configured to decode barcodes, perform optical character recognition (such as recognizing handwritten or printed addressing information), identify images, and the like. The OCR module 135 can allow the system 100 to recognize and retain information (such as the information described below in reference to FIGS. 2A-2D) included on individual items. The OCR module 135 extracts this information, converts it into a computer-readable format, and saves this information into a storage 139 of the system, for example.

The tracking and postage module 136 can include software instructions that configure the processor 131 to track and store tracking information related to the items that are sent through the distribution network 120 as part of the system 100. The tracking and postage module 136 can make use of information obtained from the processing of data from the imaging device 123 and/or scanning device 125 by the OCR module 135. The tracking and postage module 136 can further use contextual information associated with the images or scans, such as the time and/or location of the image or scan, to further track the items. Tracking information calculated by the tracking modules 136 can be stored in the tracking database 142 and available to a user via the user interface discussed above.

The tracking and postage module 136 can further create, verify, and/or store postage- or cost-indicating indicia that can be included on items that signifies postage or costs for distributing the items. In some embodiments, the tracking and postage module 136 can allow a user of the system 100 to design or upload postage- or cost-indicating indicia (e.g., in the form of a small image or symbol) to include on an item in place of a traditional stamp. When an item including one of these postage- or cost-indicating indicia is processed by the distribution network 120 (e.g., when the OCR modules 135 recognizes one the postage- or cost-indicating indicia on an item), the tracking and postage module 136 can indicate that postage has been paid for this item, or charge an appropriate postage rate to a user account. In some embodiments, actual costs associated with postage for an item are only charged when one of these postage- or cost-indicating indicia is recognized within the system 100. This will be described in greater detail below.

The pricing module 137 can be configured with software instructions that configure the processor 131 to determine and charge prices for distributing items sent through the distribution system 120. The pricing module 137 can be tied to the tracking and postage module 136, such that charges are incurred as the items are sent through the distribution network 120 (as opposed to charges being incurred through purchasing postage, which may not occur simultaneously with sending through the distribution network 120). The pricing module 137 can include instructions to read and write information to the accounts database 141 and the payment database 143.

The storage 139 can include one or more databases, such as an accounts database 141, a tracking database 142, and a payment database 143. The accounts database 141 can include information about users who have registered to use the system 100. The tracking database 142 can include tracking information about items that have been sent through the distribution network 120 as part of the system 100. The payment database 143 can include charges and payment information that accrue as items are sent through the distribution network 120 as part of the system 100. In some embodiments, these databases are interrelated, such that tracking information and/or payment information is linked with particular account information.

In general, the distribution network 120, including the above-described features, can be the facilitator of the system 100. The distribution network 120 delivers and tracks items between the various users of the system 100. As shown in FIG. 1, the users of the system can include the first level entity 140, the second level entity 160, and the third level entity 180. Although not illustrated, subsequent entity levels are also possible. Each of the entities can be an individual or an organization, such as a business. Each of these entities can also include an address at which they can receive items delivered by the distribution network. The various roles of each of these entities will become apparent from the following description of an exemplary use of the system 100.

As illustrated in FIG. 1, the first level entity 140 can include (or have access to) a computing device 144 and a printer 145. The computing device 144 can be any processor controlled hardware device. The computing device 144 can be a device that permits access to the internet, including personal computers, workstations, laptop computers, mobile computers, palm-top computers, hand-held computers, set top boxes for a television, other types of web-enabled televisions, interactive kiosks, personal digital assistants (PDAs), interactive or web-enabled wireless communications devices, mobile web browsers such as operating on a smartphone, or a combination thereof. The computing device 144 can further include one or more input devices such as a keyboard, mouse, touch pad, joystick, pen-input-pad, and the like. The computing device 144 can also include an output device, such as a visual display and/or an audio output or the like. In some embodiments, the computing device 144 is used to access the user interface noted above, for example, over the internet as illustrated. The printer 145 can be of any type and can be useable for printing one or more of the items (or labels attachable to the items) to be distributed through the system 100. Although not illustrated, in some embodiments, subsequent entity levels (for example, second level entity 160 and third level entity 180) can also include a computing device 144 and/or printer 145.

To more fully understand the utility of the multi-level distribution and tracking system 100, the general use of the system 100 will now be described in reference to the above-noted elements of the system 100, as well as the dashed arrows illustrated in FIG. 1. As previously noted, the dashed arrows represent steps in using the system 100 and/or interactions between various elements/entities of the system 100. Not all of the illustrated steps or interactions represented by the dashed arrows need occur in every embodiment. Further, the order of these steps or interactions can be varied.

As shown in FIG. 1, the first level entity 140 can (1) register with the distribution network 120. In some embodiments, registration can be required to be able to use the system 100. Registration can involve accessing the user interface 134 noted above using the computing device 144 and creating a user account. Upon creation of a user account, user account information can be stored in the accounts database 141. In some embodiments, payment information can be associated with the user account information, such that a user can be charged for making use of the system 100 and stored in the accounts database 141 and/or the payment database 143. In some embodiments, registration can also include developing, receiving, or providing a postage- or cost-identifying indicia (e.g., a computer readable-code) to be used on the items sent through the system 100. The postage- or cost-identifying indicia can be included on items in place of traditional postage, such as stamps. In some embodiments, the postage- or cost-identifying indicia can be a small logo, image, design, or symbol, or computer-readable code. During registration, the system 100 can verify and save one or more postage- or cost-identifying indicia associated with the first level entity 140 in the memory 133 and/or storage 139 (such as in the accounts database 141). As items are processed through the system 100 by the processing equipment 122 and these postage- or cost-identifying indicia are recognized (for example, via the imaging device 123 and OCR module 135), tracking and/or payment information can be stored in the payment database 143 and/or the tracking database 142 and associated with the user account of the first level entity 140 in the accounts database 141. In some instances, other computer-readable codes, such as a barcode, can be used in addition to or in place of the postage- or cost-identifying indicia.

Figure 2A:
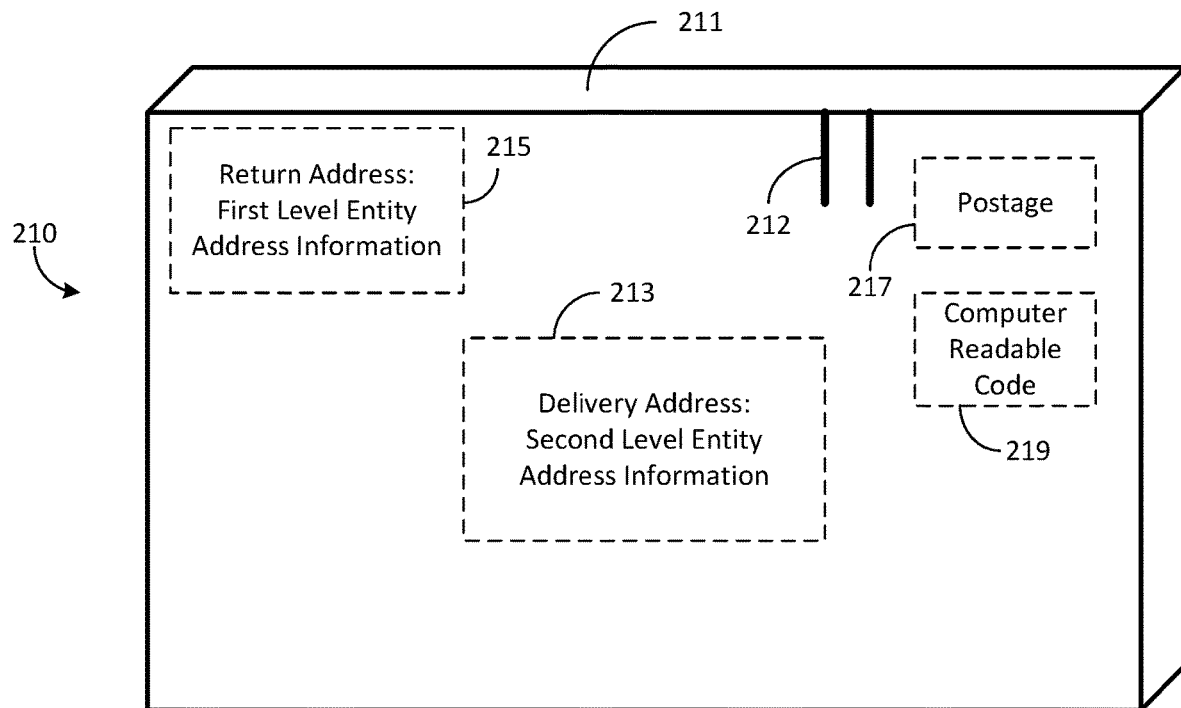
FIG. 2A is an embodiment of a first item for a first mailing through the system of FIG. 1.
Figure 2B:
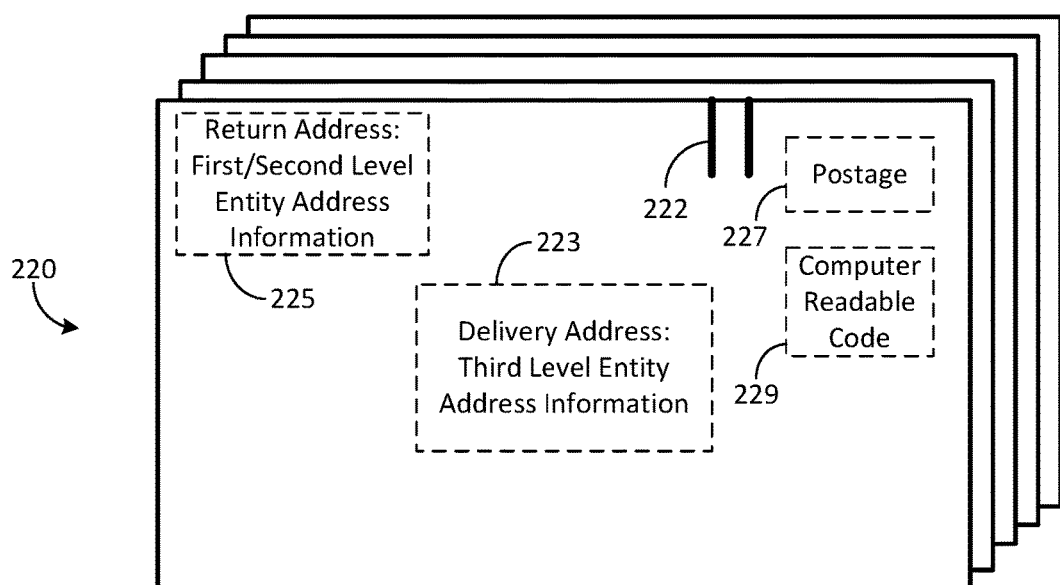
FIG. 2B is a front view of an embodiment of a second item for a second mailing through the system of FIG. 1.
Figure 2C:
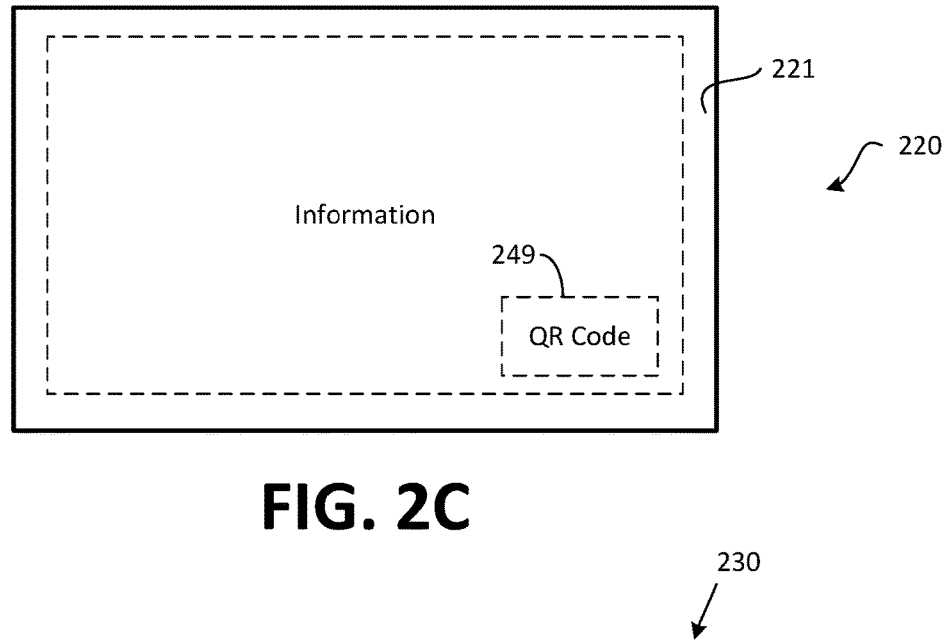
FIG. 2C is a back view of the second item of FIG. 2B.
Figure 2D:
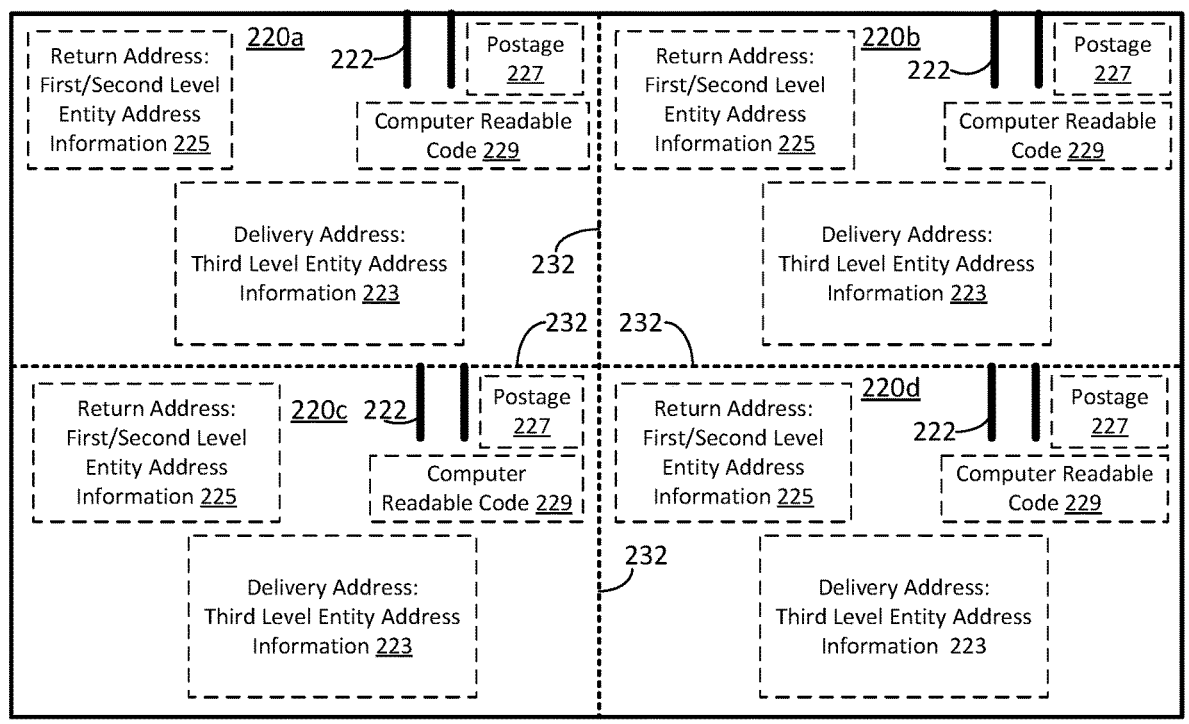
FIG. 2D is an embodiment of a single perforated sheet including four second items for a second mailing through the system of FIG. 1.
Figure 2E:
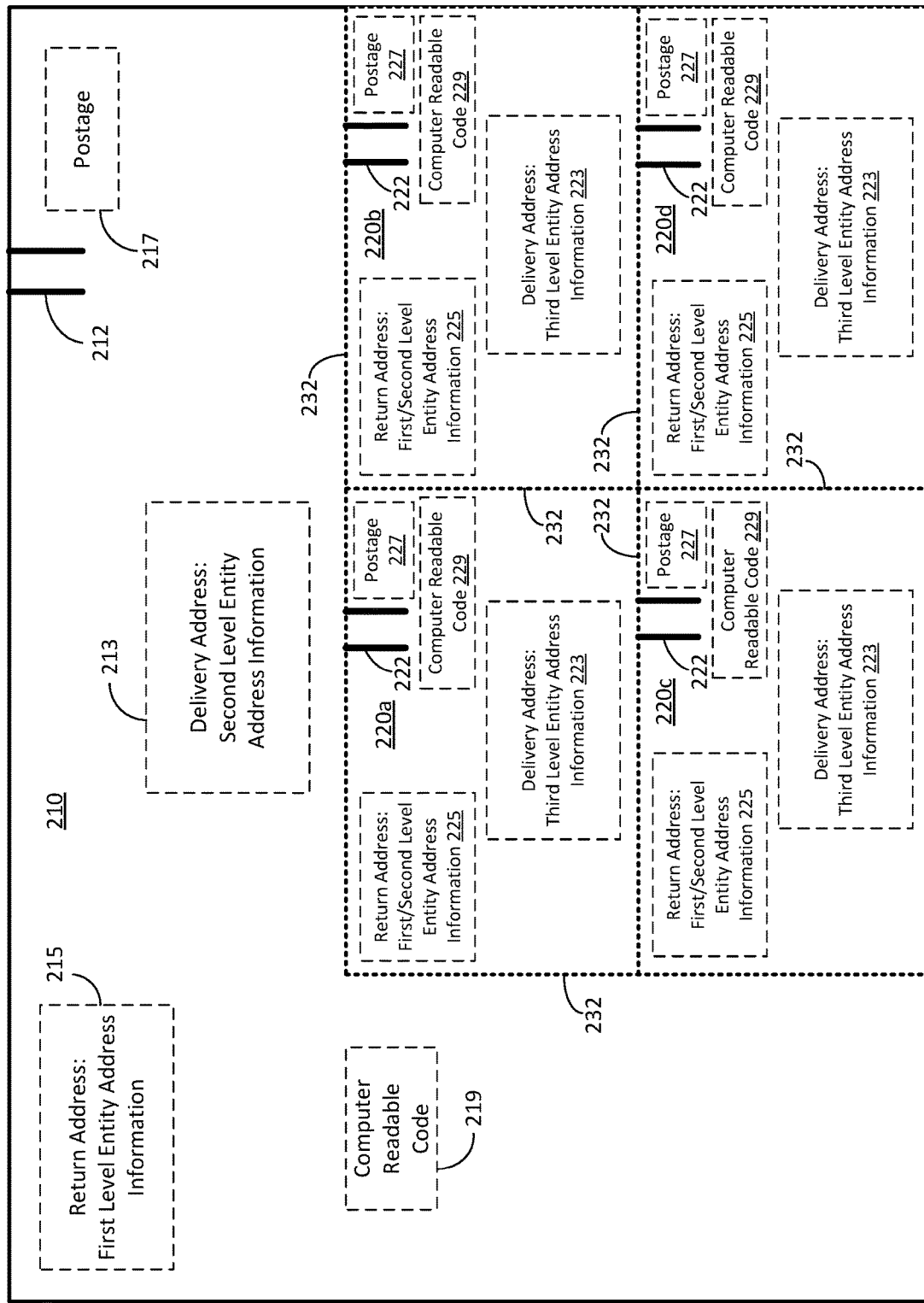
FIG. 2E is an embodiment of a single perforated sheet including one first item and four second items.

Next, the first level entity 140 can (2) prepare multi-level mail (such as the first and second items 210, 220 shown in FIGS. 2A-2E). In some embodiments, multi-level mail can include a first mailing (e.g., the first item 210) intended to be sent to a second level entity 160. The first mailing can include a second mailing (e.g., a first item including or containing one or more second items 220), which the second level entity 160 can then send to a third level entity 180. For example, the first level entity 140 can send a first item 210 (the first mailing) containing a second item 220 to the second level entity 160. The second level entity 160 can remove, detach, or separate the second item 220 from the first item 210 and send it to the third level entity 180. In some instances, the first mailing can include an outer container and the second mailing can be enclosed within the outer container. An example first item 210 is shown in FIG. 2A and example second items 220 are shown in FIGS. 2B-2D and will be described in greater detail below. FIG. 2E shows a first item 210 including detachable second items 220.

In some embodiments, the step (2) of preparing the multi-level mail can include preparing the first mailing. This can include adding delivery address information (e.g., the address of the second level entity 160), adding origination/return address information (e.g., the address of the first level entity 140), adding postage (e.g., a stamp), or adding a postage- or cost-identifying indicia (or other computer-readable code) to the outer container of the first mailing. Preparing the multi-level mail can also include preparing the second mailing. This can include adding a cost-identifying indicia (or other computer-readable code) to the second mailing. In some embodiments, the second mailing is placed within the outer container of the first mailing. In some embodiments, preparation of the multi-level mail can include using the printer 145.

Once prepared, the first level entity 140 can then, in a step (3a) deliver the first mailing to the distribution network 120. The distribution network 120 can process the first mailing and then, in a step (3b), deliver the first mailing to the second level entity 160. Processing the first mailing at the distribution network 120 can include imaging the first mailing using the imaging device 123 and/or scanning device 125. The image can be processed using the OCR module 135 and any postage- or cost-identifying indicia (or other computer-readable code) included on the exterior of the first mailing can be recognized by the system 100 (for example, by the imaging device 123 and/or scanning device 125). In some embodiments, the postage- or cost-identifying indicia (or other computer-readable code) includes encoded information, which can include a unique identifier for the item, an indication that the item is a multi-level item, unique identifiers associated with the first, second, and/or third level entities 140, 160, 180, origination and/or destination addressing information, or other types of information. Appropriate tracking and charge (payment) entries can be made with the tracking and postage module 136 in the appropriate databases. For example, the system 100 can record an entry in the tracking database 142 when the first mailing is generated, when postage is purchased, when the first mailing is inducted into the distribution network 120, and when the first mailing was sent to a recipient. The tracking entry can include the destination address and/or sending address, a computer readable identifier, an identifier identifying the first level entity preparing the mail piece, and any other desired information. Notably, because the second mailing is contained within the outer container of the first mailing, any postage- or cost-identifying indicia (or other computer-readable codes) included on the second mailing may not be recognized by the system 100 at this time. The distribution network 120 then delivers the first mailing to the second level entity 160.

Upon or after receipt of the first mailing, the second level entity 160 can prepare a second mailing using or based on the first mailing. In some embodiments, preparing the second mailing can include removing the second mailing from the outer container of the first mailing. In some embodiments, preparing the second mailing can include the step of (4) addressing the second mailing, by adding recipient address information to the second mailing. In some embodiments, the recipient address information added to the second mailing can include the address information of one or more third level entities 180. In some embodiments, a computer-readable code can be added to the second mailing, which encodes address information for the third level entities 180 or other types of information. For example, in some embodiments, the computer-readable code added to the second mailing can include a unique identifier associated with the second level entity 160.

In some embodiments, the second level entity 160 can scan or take an image of the second mailing, for example, using an application on a smartphone, to associate the second mailing with the second level entity 160. In some embodiments, the second level entity 160 may also have a user account with the system 100 (for example, stored in the accounts database 141). When the second level entity 160 scans the second mailing payment or tracking information can be stored in the payment database 143 and the tracking database 142 and associated with the second level entity 160 and/or the first level entity 140.

Once the second mailing has been addressed (e.g., by adding third level entity 180 address information), the second level entity 160 can, in a step (5a) deliver the second mailing to the distribution network 120 for processing and delivery. The distribution network 120 can then, in a step 5(b), process the second mailing and deliver the second mailing to the third level entity 180. Processing the second mailing at the distribution network 120 can include imaging the second mailing using the imaging device 123 and/or scanning device 125. The image can be processed using the OCR module 135 and any postage- or cost-identifying indicia (or other computer-readable code) can be recognized. Appropriate tracking and charge (payment) entries can be made with the tracking and postage module 136 in the appropriate databases and associated with the user account of the first level entity 140 and/or the second level entity 160. For example, the system 100 can record an entry in the tracking database 142 that the second mailing was sent from the second level entity 160 to the third level entity 180 on a certain day. The tracking entry can include the destination address and/or origination address. This information can be available to the first and/or second level entities 140, 160 through the user interface 134. The distribution network 120 can then deliver the second mailing to the third level entity 180 (5b).

In some embodiments, the first level entity 140 can, at any time, view tracking information regarding the first and/or second mailings in a step (6). As noted previously, tracking information can also be made available to the second level entity 160. In some embodiments, this can be accomplished by accessing the user interface 143 of the system 100 using the computing device 144 (for example, via a website on the internet). The tracking information can include information about when and to whom the first and second mailings have been sent. The tracking information can also include pricing and/or payment information. For example, the distribution network 120 can charge the first level entity 140 for delivery of the first and/or second mailings if and when the first and/or second mailings are delivered. In some embodiments, the first level entity 140 can view the images taken of the mailings (or the information extracted therefrom by the OCR module 135) as they were processed by the system 100. Accordingly, the system 100 allows for multi-level distribution and tracking of various items as they are delivered amongst multiple levels of recipients.

In some embodiments, the system 100 allows the first level entity 140 to monitor whether the second level entity 160 sent the second mailing to the third level entity 180. In some embodiments, the first level entity 140 can also monitor whether the third level entity 180 received the second mailing. In some embodiments, the first level entity 140 is charged for the cost of the second mailing only when the second level entity 160 actually sends the second mailing to the third level entity 180. In some embodiments, the first level entity 140 can view geographical information (e.g., GPS information) about where the second mailing is sent. In some embodiments, the system 100 also allows the first and/or second level entities 140, 160 to monitor whether the third level entity 180 acts on the second mailing. For example, the second mailing can include a computer-readable code that can be scanned by the third level entity 180. The system 100 can provide information about this scan (e.g., time, location, etc.) to the first and second level entities 140, 160.

FIG. 2A shows one embodiment of a first item 210 for a first mailing through the system 100 of FIG. 1. The first item 210 can be used as the first mailing described above. The first item 210 can include an outer container 211. The outer container 211 can enclose various second mailing materials (such as those shown in FIGS. 2B-2D) and/or other items. The outer container 211 can be a box, envelope, or other container.

As shown, information can be included on the exterior of the first item 210 so that the information can be used to process the first item 210 by the distribution network 120. This information can include delivery address information 213. The delivery address information 213 can represent the desired destination address to which the first item 210 is to be delivered. The delivery address information 213, in some embodiments, can be address information for a second level entity 160. Return/origination address information 215 can also be included on the first item 210. Return/origination address information 215 can include the address of the sending party. In some embodiments, the return/origination address information 215 can include an address of the first level entity 140 sending the first item 210. In some embodiments, the delivery address information 213 and the return/origination address information 215 can include a computer readable code encoding information indicative of the delivery address and the origination address, and identities of the recipient and the sending party.

The first item 210 can also include postage 217. In some embodiments, postage 217 can include one or more stamps. In some embodiments, the postage 217 can be a postage- or cost-identifying indicia as discussed above. In some embodiments, the first item 210 can also include one or more computer-readable codes 219. For example, the computer-readable code 219 can be a barcode. The postage- or cost-identifying indicia and/or computer-readable code 219 can be recognizable by the distribution network 120 as the first item 210 is processed (for example, by the imaging device 123 or scanning device 125). For example, the distribution network 120 can scan the cost-identifying indicia and/or computer-readable code 219 as part of the processing of the first item 210. This scan can provide or generate tracking information regarding the first item 210. In some embodiments, the first item 210 also includes a facing identification mark 212. The facing identification mark 212 can be used by the distribution network 120 to correctly orient the first item 210 during processing to facilitate scanning and/or imaging of the first item 210 during processing.

In some embodiments, the computer-readable code 219 encodes a unique identifier associated with the first, second, or third level entities 140, 160, 180, an indication that the item 210 is a multi-level item, origin or destination address information, etc. In some embodiments, the information included in the various fields of the item 210 can be combined one or more fields. For example, the computer-readable code 219 can include return address information 215, delivery address information 213, and/or postage information 217. Other combinations of these fields are possible.

The locations of the delivery address 213, return/origination address 215, postage 217, computer-readable code 219, and/or facing identification mark 212 shown in FIG. 2A are merely provided by way of example. In some embodiments, one or more of these can be positioned in other locations or omitted.

FIG. 2B shows a front view of one embodiment of a second item 220 for a second mailing through the system of FIG. 1. The second item 220 can be used as the second mailing described above. The second item 220 can include a substrate 221. For example, a substrate 211 can be single sheet of material (e.g., paper, cardstock, plastic, etc.) onto which information is printed. In some embodiments, the second item 220 can include an outer container (e.g., an envelope or box) enclosing additional information.

As shown, information can be included on the second item 220 that can be used to process the second item 220 by the distribution network 120. This information can include delivery address information 223. The delivery address information 223 can represent the desired destination address to which the second item 220 is to be delivered. The delivery address information 223, in some embodiments, can be address information for a third level entity 180. Return/origination address information 225 can also be included on the second item 220. Return/origination address information 225 can include the address of the sending party (e.g., the second level entity 160). In some embodiments, the return/origination address information 225 can include an address of the second level entity 160 sending the second item 220. In some embodiments, the return/origination address information 225 can include the address of the first level entity 140.

The second item 220 can also include postage 227. In some embodiments, postage 227 can include one or more stamps. In some embodiments, the postage 227 can be a postage- or cost-identifying indicia as discussed above. In some embodiments, the second item 220 can also include one or more computer-readable codes 229. For example, the computer-readable code 229 can be a barcode. The cost-identifying indicia and/or computer-readable code 229 can be recognizable by the distribution network 120 as the second item 220 is processed. For example, the distribution network 120 can scan the postage- or cost-identifying indicia and/or computer-readable code 229 as part of the processing of the second item 220 with, for example, the imaging device 123 or the scanning device 125. This scan can provide or generate tracking information regarding the second item 220. In some embodiments, the second item 220 also includes a facing identification mark 222. The facing identification mark 222 can be used by the distribution network 120 to correctly orient the second item 220 during processing to facilitate scanning and/or imaging of the second item 220 during processing.

The locations of the delivery address 223, return address 225, postage 227, computer-readable code 229, and/or facing identification mark 222 shown in FIG. 2B are merely provided by way of example. In some embodiments, one or more of these can be positioned in other locations, omitted, or combined.

FIG. 2C shows a back view of the second item 220 of FIG. 2B. In some embodiments, information can be included on a back side of the second item 220. This information can include printed material representative of information desired to be communicated by the first level entity 140 and/or the second level entity 160 to the third level entity 180. The information can also include one or more computer-readable codes 249, such as the illustrated QR code. In some embodiments, a third level entity 180 can scan these computer-readable codes 249 (with, for example, an application on a mobile phone) to be directed to additional online information or for other reasons (e.g., computer-readable code 249 can be a coupon). In some embodiments, the information and computer-readable codes 249 shown in FIG. 2C can be included on the first side (FIG. 2A) of the second item 220, or within an outer container of the second item 220 (not shown), or omitted. In some embodiments, when the third level entity scans the computer-readable code 249, information regarding the scan (e.g., time of scan, geographical location of scan, etc.) is provided or made available to the first and/or second level entities 140, 160.

FIG. 2D shows an embodiment of a single perforated sheet 230 including four second pieces of mail 220a, 220b, 220c, 220d for a second mailing through the system of FIG. 1. Each of the four second pieces of mail 220a, 220b, 220c, 220d can be substantially similar to the second item 220 described in reference to FIGS. 2B and 2C. However, the four second pieces of mail 220a, 220b, 220c, 220d are all formed on a single substrate. The substrate can include perforations 232, which allow the four second pieces of mail 220a, 220b, 220c, 220d to be separated from each other for mailing to several third level entities 180.

FIG. 2E is an embodiment of a single perforated sheet including a first item 210 and four second items 220a, 220b, 220c, 220d. The first item 210 can include the same information as the first item 210 described above. Each of the second items 220a, 220b, 220c, 220d can include the same information as the second item 220 described above. In some embodiments, the entire sheet can be sent as the first mailing (e.g., from the first level entity 140 to the second level entity 160). During the first mailing, the distribution network can scan any computer-readable code (e.g., computer-readable code 219 or computer-readable code 229). If the distribution network 120 has not previously scanned any of these computer-readable codes 219, 229, the distribution network 120 will treat the sheet as the first mailing. When the sheet is delivered to the second level entity 160, the second level entity 160 can detach or separate the second items 220a, 220b, 220c, 220d, using the perforations 232. The second level entity 160 can then send the second items 220a, 220b, 220c, 220d to a third level entity 180.

Figure 3:
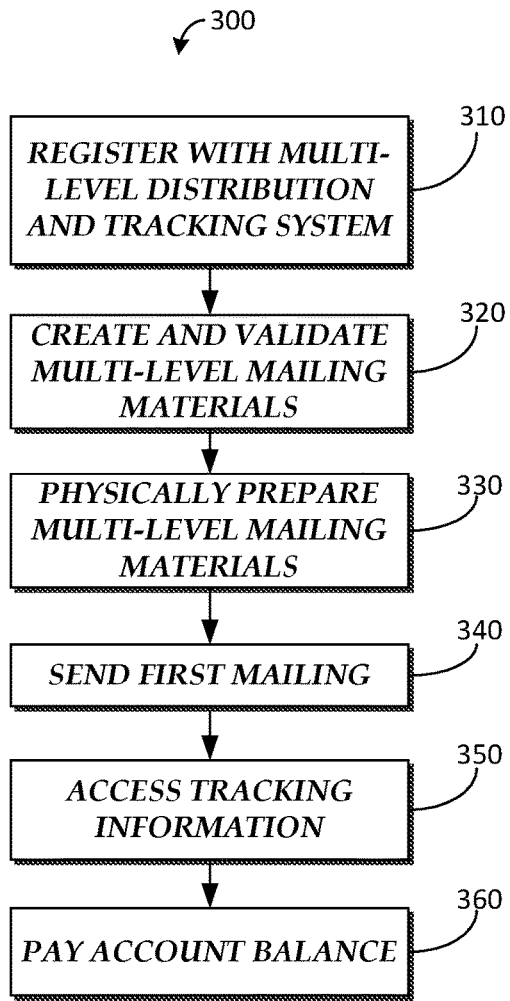
FIG. 3 is a flowchart illustrating an embodiment of a method of use for a first level entity using a multi-level distribution and tracking system.

FIG. 3 is a flowchart illustrating an embodiment of a method 300 of use for a first level entity using a multi-level distribution and tracking system. In some embodiments, the first level entity 140 is the first level entity 140 of FIG. 1, and the multi-level distribution and tracking system can be the system 100 described above.

The method 300 begins at block 310 where the first level entity 140 registers with the multi-level distribution and tracking system 100. Registration can include creating a user account. In some embodiments, registration can include providing payment information, such that use of the system 100 can be charged to the user account. In some embodiments, registration can occur online, for example, through a website associated with the system 100. In some embodiments, registration is a prerequisite for use of the system 100. In some embodiments, registration may not be required.

At block 320, the first level entity 140 creates and/or validates multi-level mailing materials. Multi-level mailing materials can include materials intended to be distributed to a second level entity 160. In some embodiments, the at least a portion of the materials are intended to be further distributed from the second level entity 160 to a third level entity 180. Creation of the multi-level materials can include creating, registering, and/or receiving one or more computer-readable codes and/or postage-indicating indicia from the system 100. The one or more computer-readable codes and/or postage-indicating indicia can be associated with the first level entity's user account.

At block 330 the first level entity 140 can physically prepare the multi-level mailing materials. In some embodiments, the multi-level mailing materials include a first mailing (e.g. the first item 210 including the second items 220) and a second mailing (e.g., the second items 220). The first mailing can be for distribution from the first level entity 140 to the second level entity 160. The first mailing can enclose the second mailing. The second mailing can be for distribution from the second level entity 160 to the third level entity 180. In some embodiments, preparing the multi-level mailing materials includes adding second level entity address information to the first mailing. In some embodiments, the first level entity 140 does not add destination address information to the second mailing (as this address information can be added later by the second level entity). Preparing the multi-level mailing materials can also include printing or otherwise affixing the one or more computer-readable codes and/or postage-indicating indicia on the first mailing and/or the second mailing.

At block 340 the first level entity 140 sends the first mailing (which can enclose the second mailing) to the second level entity 160. This can include delivering the first mailing to a distribution network 120 that will deliver the first mailing to the second level entity 160. In some embodiments, the first mailing is given directly to the second level entity 160, such that the first mailing need not be sent through a distribution network 120. For example, the first level entity 140 can physically deliver the first mailing directly to the second level entity 160.

At block 350 the first level entity 140 can access tracking information. In some embodiments, tracking information is accessed through a website associated with the system 100. The tracking information can provide information about when and to whom the first mailing and/or the second mailing has been sent. For example, the tracking information can indicate to the first level entity 140 that the second level entity 160 has sent the second mailing to the third level entity 180 on a certain day. The first level entity 140 can obtain access to tracking information by providing credentials registered with the distribution network 120. in some embodiments, the return/origination address information can include an identifier associated with the first level entity 140. As the items or mail pieces move throughout the distribution network 120, the server 130 can receive and store, associate, and/or group data regarding items having the first level entity's identifier encoded thereon, which the server 130 can make available to the first level 140 entity for review, tracking, and the like. The first level entity 140 can also obtain information regarding the activities of the second level entity 160, such as when the second mailing, having the computer readable code 227 thereon, is inducted into the distribution network 120 or delivered to a third level entity 180. The computer readable code 227 can encode information related to the second level entity 160 and the second level entity delivery address 213 such that the first level entity 140 can track which of a plurality of second level entities 160 performed a given action.

In some embodiments, the second level entity 160 can similarly have an identifier encoded on the second item 220, and the second level entity 160 can access tracking information and receive information regarding the second mailings as they move through the distribution network 120 and to the third level entities 180.

At block 360 the first level entity 140 can pay an account balance. The first level entity 140 can be charged as the first mailing and/or the second mailing is processed by the distribution network 120. In some embodiments, charges are incurred by the first level entity 140 only as the first and/or second mailings are processed. Although not illustrated, in some embodiments, the first level entity 140 can additionally perform one or more of the steps of the method 400 of FIG. 4 described below.

Figure 4:
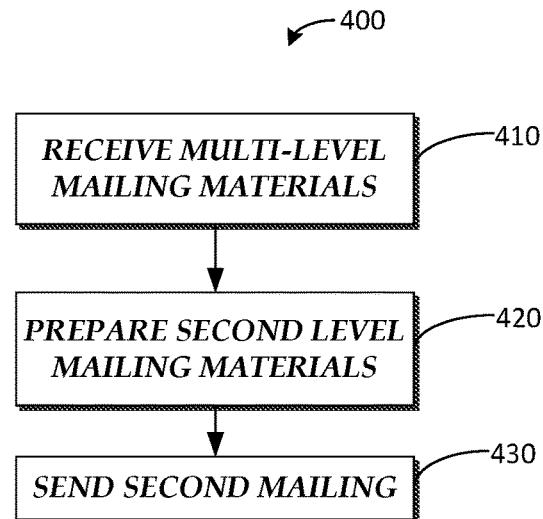
FIG. 4 is a flowchart illustrating an embodiment of a method of use for a second level entity using a multi-level distribution and tracking system.

FIG. 4 is a flowchart illustrating an embodiment of a method 400 of use for the second level entity 160 using a multi-level distribution and tracking system 100.

The method 400 begins at block 410 where the second level entity 160 receives multi-level mailing materials. The multi-level mailing materials can be received directly from a first level entity 140 or by means of a distribution network 120. In some embodiments, the multi-level mailing materials include a first mailing enclosing a second mailing. The second mailing can comprise second mailing materials for distribution to one or more third level entities 180. The second level entity 160 can remove the second mailing from the first mailing.

At block 420, the second level entity 160 prepares the second mailing materials. This can include adding address information for one or more of the third level entities 180 to the second mailing materials. At block 430 the second level entity 160 sends the second mailing. This can include delivering the second mailing materials (e.g., the second items 220) to a distribution network 120. Although not illustrated, in some embodiments, the second level entity 120 can additionally perform one or more of the steps of the method 300 of FIG. 3. In some embodiments, the second level entity 160 can scan the second mailing using an application on a smartphone, for example. Information regarding this scan be generated and associated with the user account for the second level entity 160 and/or made available to the first level entity 140.

Figure 5:
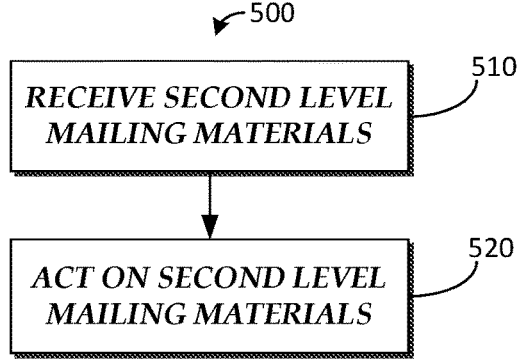
FIG. 5 is a flowchart illustrating an embodiment of a method of use for a third level entity using a multi-level distribution and tracking system.

FIG. 5 is a flowchart illustrating an embodiment of a method 500 of use for a third level entity 180 using a multi-level distribution and tracking system 100.

The method 500 begins at block 510 where the third level entity 180 receives the second mailing materials. The second mailing materials can be delivered to the third level entity 180 by the distribution network 120. At block 520, the third level entity 180 can then act on second mailing materials. The action can vary depending on additional information included on the second mailing materials. For example, the second mailing materials can include a coupon, which the third level entity 180 acts upon by redeeming. As another example, the second mailing materials can include a QR code. The third level entity 180 acts by scanning the QR code, which directs the third level entity 180 to additional online information. Other examples of using the system 100 are described below.

Figure 6:
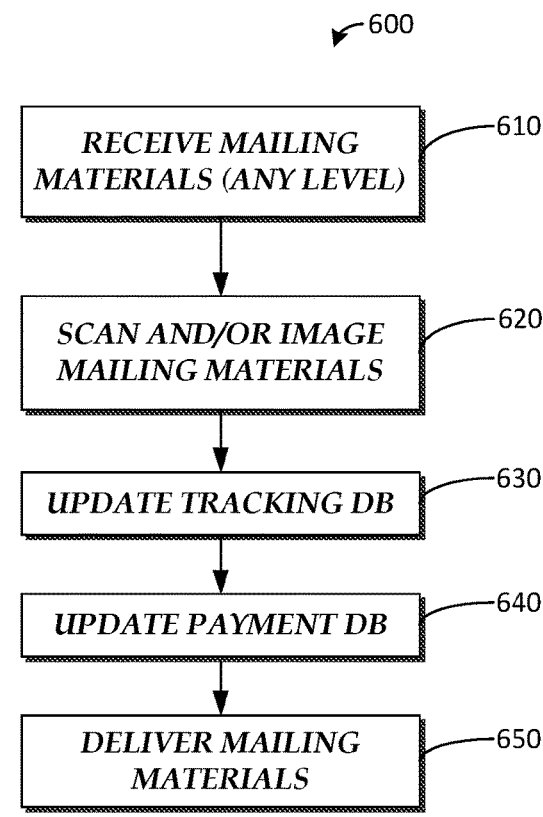
FIG. 6 is a flowchart illustrating an embodiment of a method of use for a distribution network using a multi-level distribution and tracking system.

FIG. 6 is a flowchart illustrating an embodiment of a method 600 of use for a distribution network 120 using a multi-level distribution and tracking system 100. In some embodiments, distribution network is the distribution network 120 of FIG. 1, and the multi-level distribution and tracking system can be the system 100.

The method 600 begins at block 610 where the distribution network 120 receives mailing materials. In some embodiments, the mailing materials can include first mailing materials (e.g., the first item 210 including the second items 220) received from a first level entity 140 for delivery to a second level entity 160. In some embodiments, the mailing materials include second mailing materials (e.g., the second items 220) received from a second level entity 160 for delivery to a third level entity 180.

At block 620, the distribution network 120 scans and/or images the received mailing materials. This can include using the scanning device 125 to scan any computer-readable codes included on the mailing materials. This can also include taking an image of the mailing materials using the imaging device 123. In some embodiments, the image can be processed to extract information therefrom. For example, the image can be processed by an OCR module as described above. The OCR module 135 can recognize hand-written or printed addressing information included on the mailing materials. In some embodiments, the OCR module 135 can recognize postage- or cost-indicating indicia included on the mailing materials. In some embodiments, contextual information, such as the time and/or location of the scan or image, can be associated with the scan or image.

At block 630, the distribution network 120 can update a tracking database 142. The tracking database 142 can be updated to include information obtained at block 620. For example, the tracking database 142 can be updated to include an entry that the mailing materials were processed at a certain location at a certain time, or an entry that the mailing materials were delivered to a recipient at a certain time. In some embodiments, the tracking database 142 can also be updated to include destination and/or origination address information obtained from the OCR module 135. In some embodiments, the tracking database 142 can store an image of the mailing materials.

At block 640, the distribution network 120 can update a payment database 143. The payment database 143 can be updated to include a charge for processing the mailing materials. The charge can be a fee for using the system and/or delivering the mailing materials to their destination. In some embodiments, the charge can be associated with a user account. In some embodiments, the charge is only incurred as the mailing materials are processed. For example, the OCR module 135 can recognize a postage- or cost-indicating indicia or computer-readable code on the mailing materials. The postage-indicating indicia or computer-readable code can be associated with a user account. A charge associated with processing and delivering the mailing materials can then be charged to the associated user account, and a corresponding entry can be included in the payment database 143.

At block 650, the distribution network 120 delivers the mailing materials to their destination. This can include delivering first mailing materials to a second level entity 140 or delivering second mailing materials to a third level entity 160.

Several examples of systems and methods for multi-level distribution and tracking will now be described. These examples are intended to illustrate the concepts discussed above in the context of particular applications. However, these examples are non-limiting, and the systems and methods for multi-level distribution and tracking can be used in a large number of other applications and include features not present in these examples.

As one example, a parent company (first level entity 140)—such as the headquarters of a pizza chain, for example—could create a marketing campaign that includes a special offer or coupon. The parent company could use the systems and methods described herein to distribute marketing campaign materials to its franchisees (second level entities 160), which could then distribute the offer or coupon to their customers (third level entities 180). To use the system, the parent company may need to register with the distribution network 120.

The parent company can then prepare the mailer coupons to distribution network-approved specifications. The mail coupons can include a cost-identifying indicia and/or computer-readable code as described above. Using an outer wrapper (for example, a box or an envelope), the parent company could then send those coupons to its franchisees (first mailing). Other promotional materials, like window posters or standups, could also be included. The franchisees could then send the special offer—without needing to purchase and affix postage because of the cost-identifying indicia and/or computer-readable code—to its customers using a local mail list (second mailing). The parent company's account can be charged as the materials are sent to the customers and processed by the distribution network. The pizza chain's customers could then redeem the coupon or special offer, thus boosting customer satisfaction and providing valuable tracking information, through the system's tracking information, to measure the success of the campaign. When the franchisees mail the special offer to their customers, benefits may accrue for the franchisees as well. For example, the may receive a monetary benefit from the parent company.

This model can work for virtually any business with a middleman, whether it is franchises, as above, or retail stores. One example of a retail store using the system could be a clothing brand (first level entity 140) that sells through high-end department stores (second level entities 160) and wants to reward customers (third level entities 180) who regularly buy their brand. As another example, a pharmaceutical company (first level entity) that wants to promote its latest cold remedy can also use the system. The pharmaceutical company could send a package of coupons to the pharmacies (second level entities 160) it sells through. The pharmacies, using their local mail lists, could then send the coupons to area residents (third level entities 180). The pharmaceutical company's account with the system would be charged as coupons are sent, and the pharmaceutical company would receive tracking information about when and/or to whom the coupons are sent.

In another model, a company (first level entity 140) can use the system to connect directly with its customers (second level entity 160), and encourage them to use mail to connect with their social group. This can create opportunities not only to expand brand awareness, but also to create positive customer experiences. For example, a hair salon (first level entity 140) can send its customers (second level entity 160) a card with a coupon that they then can then send to a friend (third level entity 180), with postage paid by the hair salon. In some instances, when the friend redeems the coupon online, they both get a free haircut.

Another example is using the system to send thank-you cards (or similar notes). For example, a customer (third level entity 180) orders a gift basket from an online retailer (first level entity 140). The basket is sent to the customer's friend or family member (second level entity 160), and inside the basket is a thank-you card with the postage already paid (for example, the thank-you card could include a cost-identifying indicia and/or computer-readable code as noted above). The recipient of the basket (second level entity 160) then sends the thank-you card to the person who sent the basket (third level entity 180).

In another example, a local country club (first level entity 140) mails an envelope to club members or frequent players (second level entities 160). The envelope contains an offer to the club member, and invites him/her to mail the three enclosed cards to his/her friends (third level entities 180). The envelope also has a game inside that the recipient can play. Game play and rules can be found by scanning a QR code that takes them to a YouTube video. The club member can then mail the cards to his/her friends, inviting them to go to the golf club's website to fulfill the offer. The club funds the mailing of the cards via the system as described herein.

In some embodiments, the system can be used to help ensure that important documents are circulated and mailed promptly by providing multiple postage-paid envelopes (for example, the envelopes can include cost-identifying indicia and/or computer-readable codes as noted above). For example, a medical insurance claims processing company (first level entity 140) could send a first envelope to its customer (second level entity 160) that includes: a form that needs to be filled out by both the patient and her physician (third level entity 180); a second envelope for the patient to send the form to her physician; and a third envelope, which the physician will use to return the completed form to the insurance company (in this embodiment, the insurance company can also be considered a fourth level entity). Each of the envelopes can include postage indicating-indicia or computer-readable codes, such that postage is charged to the medical insurance claims processing company as the items are mailed. Further, by using the system, the claims processing company and others can track the status of mail that needs to be circulated and then returned.

Another example can include creating or selling postcards that already have the postage paid. The postcards can include postage-indicating indicia or computer-readable codes that allow a purchaser (second level entity 160) to send the postcard to a third level entity without paying postage. Postage for the postcards can be charged to a user account associated with the vender or distributor (first level entity 140) as the postcards are sent through the mail.

Although this disclosure discusses processing and sending pieces of mail between the various entities, it will be appreciated that the systems and methods described herein are not limited to this context. Other items, processed and distributed by other means can also be used.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the inventions should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged, or excluded from other embodiments.

As used herein a graphical user interface can include a web-based interface including data fields for receiving input signals or providing electronic information. The graphical user interface can be implemented in whole or in part using technologies such as HTML, Flash, Java, .net, web services, and RSS. In some implementations, the graphical user interface can be included in a stand-alone client (for example, thick client, fat client) configured to communicate in accordance with one or more of the aspects described.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

Information and signals can be represented using any of a variety of different technologies and techniques. For example, data, instructions, commands, information, signals, bits, symbols, and chips that can be referenced throughout the above description can be represented by voltages, currents, electromagnetic waves, electromagnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the disclosure.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the inventions disclosed herein. Consequently, it is not intended that this disclosure be limited to the specific embodiments disclosed herein, but that it cover all modifications and alternatives coming within the true scope and spirit of the disclosure as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A distribution item comprising:
    a first item including:
        a first computer-readable code disposed on a first portion, the computer-readable code associated with a first level entity, and
        destination information associated with a second level entity disposed on a second portion; and
    a plurality of second items removably connected to the first item, each of the plurality of second items having a front side and a back side opposite the front side, wherein a second computer-readable code associated with the first level entity and destination information associated with one of a plurality of third level entities are disposed on the front side, and wherein printed material is disposed on the back side.

2. The distribution item of claim 1, wherein the first item includes a first unique identifier on the first item and each of the plurality of second items includes a second unique identifier on each of the plurality of second items.

3. The distribution item of claim 2, wherein each of the second unique identifiers on each of the plurality of second items is associated with the first level entity.

4. The distribution item of claim 1, wherein the first item and the plurality of second items are on a substrate divided into the first item and the plurality of second items by perforations, configured such that the substrate can be torn along the perforations to separate the plurality of second items from the first item, and to separate the plurality of second items from each other.

5. The distribution item of claim 1, wherein, when the plurality of second items are removed from the first item, the second computer-readable codes included on the one or more second items are configured to be scanned by an imaging device of a delivery network.

6. The distribution item of claim 5, wherein, when the second computer-readable codes included on the plurality of second items are scanned by the imaging device, tracking information regarding the one or more second items is generated associated with the first level entity.

\* \* \* \* \*